(12) United States Patent
England et al.

(10) Patent No.: US 8,738,890 B2
(45) Date of Patent: *May 27, 2014

(54) COUPLED SYMBIOTIC OPERATING SYSTEM

(75) Inventors: Paul England, Bellevue, WA (US); Jork Loeser, Woodinville, WA (US); Luis Irun-Briz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,908

(22) Filed: Jul. 8, 2011

(65) Prior Publication Data

US 2011/0265097 A1    Oct. 27, 2011

Related U.S. Application Data

(63) Continuation of application No. 11/959,467, filed on Dec. 19, 2007, now Pat. No. 7,996,648.

(51) Int. Cl.
*G06F 9/52* (2006.01)
*G06F 12/08* (2006.01)

(52) U.S. Cl.
USPC ............ 711/203; 711/206; 718/106; 719/312

(58) Field of Classification Search
None
See application file for complete search history.

(56) References Cited

U.S. PATENT DOCUMENTS

| | | | |
|---|---|---|---|
| 6,363,467 B1 | 3/2002 | Weeks | |
| 7,146,607 B2 * | 12/2006 | Nair et al. | 717/151 |
| 7,293,251 B2 | 11/2007 | Zeman et al. | |
| 7,783,838 B1 | 8/2010 | Agesen et al. | |
| 7,788,669 B2 | 8/2010 | England et al. | |
| 7,818,808 B1 | 10/2010 | Neiger et al. | |
| 2004/0177342 A1 | 9/2004 | Worley | |
| 2004/0230794 A1 | 11/2004 | England et al. | |
| 2005/0013705 A1 | 1/2005 | Farkas et al. | |

(Continued)

OTHER PUBLICATIONS

Snavely et al., "Symbiotic Jobscheduling for a Simultaneous Multithreading Processor", In the Proceedings of Asplos IX, Nov. 12-15, 2000, ACM, 234-244.

(Continued)

*Primary Examiner* — Gary Portka
(74) *Attorney, Agent, or Firm* — Dan Choi; Carole Boelitz; Micky Minhas

(57) ABSTRACT

A single application can be executed across multiple execution environments in an efficient manner if at least a relevant portion of the virtual memory assigned to the application was equally accessible by each of the multiple execution environments. A request by a process in one execution environment can, thereby, be directed to an operating system, or other core software, in another execution environment and can be made by a shadow of the requesting process in the same manner as the original request was made by the requesting process itself. Because of the memory invariance between the execution environments, the results of the request will be equally accessible to the original requesting process even though the underlying software that responded to the request may be executing in a different execution environment. A similar thread invariance can be maintained to provide for accurate translation of requests between execution environments.

11 Claims, 9 Drawing Sheets

(56) References Cited

U.S. PATENT DOCUMENTS

| | | |
|---|---|---|
| 2005/0044319 A1 | 2/2005 | Olukotun |
| 2006/0004942 A1 | 1/2006 | Hetherington et al. |
| 2006/0004995 A1 | 1/2006 | Hetherington et al. |
| 2006/0136924 A1 | 6/2006 | Sadiq et al. |
| 2006/0242442 A1 | 10/2006 | Armstrong et al. |
| 2007/0074011 A1 | 3/2007 | Borkar et al. |
| 2007/0130445 A1 | 6/2007 | Lau et al. |
| 2007/0157211 A1 | 7/2007 | Wang et al. |
| 2007/0266435 A1 | 11/2007 | Williams et al. |

OTHER PUBLICATIONS

Leroux et al., "Symbiotic Legacy Applications to Multicore Processors", QNX Software, 2006, 4 pages.

Ho et al., "Practical Taint-Based Protection using Demand Emulation", Proceedings of the ACM SIGOPS/EuroSys European Conference on Computer Systems, Apr. 18-21, 2006, 29-42.

Ta-Min et al., "Splitting Interfaces: Making Trust between Application and Operating Systems Configurable", Department of Electrical and Computer Engineering, University of Toronto, 2006, pp. 1-14.

* cited by examiner

COUPLED SYMBIOTIC OPERATING SYSTEM

CROSS REFERENCE

This application is a continuation of U.S. application Ser. No. 11/959,467, filed Dec. 19, 2007, now U.S. Pat. No. 7,996,648, granted Aug. 9, 2011, which is hereby incorporated by reference in its entirety.

BACKGROUND

The efficiency with which a computing device can perform a task used to be, in large part, determined by the frequency with which its Central Processing Unit (CPU) could execute computer-readable instructions. CPUs that executed instructions at a higher frequency could perform a greater amount of work within a given time. As the frequency with which CPUs executed instructions began to reach practical limits, computing devices began to include multiple CPUs that could perform multiple tasks in parallel. For such computing devices, if a task was designed, and programmed, such that segments of computer-executable instructions could be executed in parallel, then that task could be performed more efficiently by executing, in parallel, those segments on the multiple CPUs of the computing device.

Unfortunately, for many tasks, the input to one set of computer-executable instructions is based on, or affected by, the output of a prior set of computer-executable instructions. Consequently, such tasks can be difficult to execute in parallel and the execution of such tasks may utilize only one of the multiple CPUs that can be available. Nevertheless, a computing device with multiple CPUs may still provide efficiency benefits, even for tasks that are difficult to parallelize, because users often request the execution of multiple such tasks in parallel, thereby parallelizing the achievement of the user's overall goals.

To provide purchasers of computing devices with expandability, add-on hardware that itself contains one or more CPUs can be added to the computing device. Similarly, virtual computing environments can be used and expandability can, thus, be achieved via the addition of further virtual computing environments. In such cases, however, it may not be practical to extend core software, such as the operating system, to the multiple CPUs or other execution hardware. Instead, the each of the execution environments that were subsequently added can execute their own copy of an operating system or other core software. While such an operating system may be identical to the operating system executing on the original "host" CPU or execution environment, communication between the two, or more, copies of the operating system will be limited to, essentially, inter-computing-device communications. Thus, the addition of such additional computing environment, virtual or physical, to a computing device, can expand the ability of the computing device to execute multiple independent tasks in parallel, but may not expand the ability of the computing device to execute a single, parallelizable, task in a more efficient manner.

SUMMARY

To efficiently utilize multiple execution environments, such as execution environments supported by one or more auxiliary CPUs, or by one or more virtual computing environments, communication between the multiple execution environments can be designed to enable a single instance of an operating system, or other core software, to provide services to computer-executable instructions being executed in the other execution environments. Such a provision of services from a "host" operating system, or other core software, executing on a "host" execution environment, can enable the remaining execution environments to utilize reduced operating systems, or otherwise minimize the core software supporting such execution environments. In addition, the provision of host operating system services can enable more effective utilization of the remaining execution environments, such as by supporting the delegation of the performance of sub-tasks to such other execution environments. In an analogous manner, the "host" environment can itself utilize services of other environments, such that the designation of "host" and "auxiliary" environments is interchangeable and can vary depending on the particular computer-executable instructions being executed.

In one embodiment, requests from processes executing on auxiliary execution environments can be translated into requests on a host execution environment by providing an identical memory mapping on both the host execution environment and the auxiliary execution environment. In particular, for a given process executing in one execution environment, a shadow process can exist in the other execution environment such that both the process and its shadow utilize identical virtual memory that maps to the same region of physical memory. A shadow process in an auxiliary execution environment can be created by default, or otherwise created automatically, or it can be based on a request from the host execution environment, which can be triggered by a flag passed to the host operating system when a host process was created, or can be triggered by an explicit request from the host process itself, or, alternatively, can be triggered by an external set of instructions specifically designed to enable a user to request the creation of shadow processes in one or more auxiliary execution environments.

In another embodiment, an identical memory mapping on both the host execution environment and the auxiliary execution environment can provide for the translation of requests from processes executing in the auxiliary execution environment to the host operating system executing in the host execution environment. A request directed to an operating system function, or other core software function, not implemented within the auxiliary execution environment, such as a function that is better implemented elsewhere, can be intercepted within the auxiliary execution environment and communicated to the host execution environment, where an identical request can be made by a shadow process of the original requesting process. Due to the identical memory mapping, the request made by the shadow process within the host execution environment behaves in the same manner as if the original requesting process was executing on top of the host operating system. In one embodiment, the reduced operating system of the auxiliary execution environment can act to intercept, and communicate to the host execution environment, those requests that the reduced operating system is not designed to handle and the shadow process executing in the host execution environment can receive such communications.

In a further embodiment, to maintain an identical memory mapping on both the host execution environment and the auxiliary execution environment, changes to the memory mapping can be shared among the two or more execution environments. The page table relating virtual memory to physical memory can be shared between two or more execution environments, thereby automatically providing for the sharing of changes to the memory mapping. Alternatively, memory-mapping-specific system calls can be intercepted on both the auxiliary and host execution environments, and the resulting memory mapping changes can then be communicated to one another. As another alternative, a hook can be provided within the operating systems of both the host and auxiliary execution environments such that independent processes can be notified of memory mapping modifications within either execution environment, and thereby share such changes with the other execution environment.

In a still further embodiment, the translation of requests from processes executing in the auxiliary execution environment to the host operating system executing in the host execution environment can be performed such that an appropriate thread of a shadow process executing in the host environment performs the translated request. The shadow process executing in the host execution environment can be associated with a requesting process executing in the auxiliary execution environment and can comprise threads analogous to the threads of the requesting process. If a thread is created, destroyed, or dies within the requesting process executing in the auxiliary execution environment, than an analogous thread can be created, destroyed, or allowed to die, respectively, within the shadow process executing in the host execution environment. A translated request originating from a particular thread of the requesting process can then be made by an analogous thread within the shadow process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

BRIEF DESCRIPTION OF THE DRAWINGS

The following detailed description may be best understood when taken in conjunction with the accompanying drawings, of which.

DETAILED DESCRIPTION OF ILLUSTRATIVE EMBODIMENTS

Figure 1:
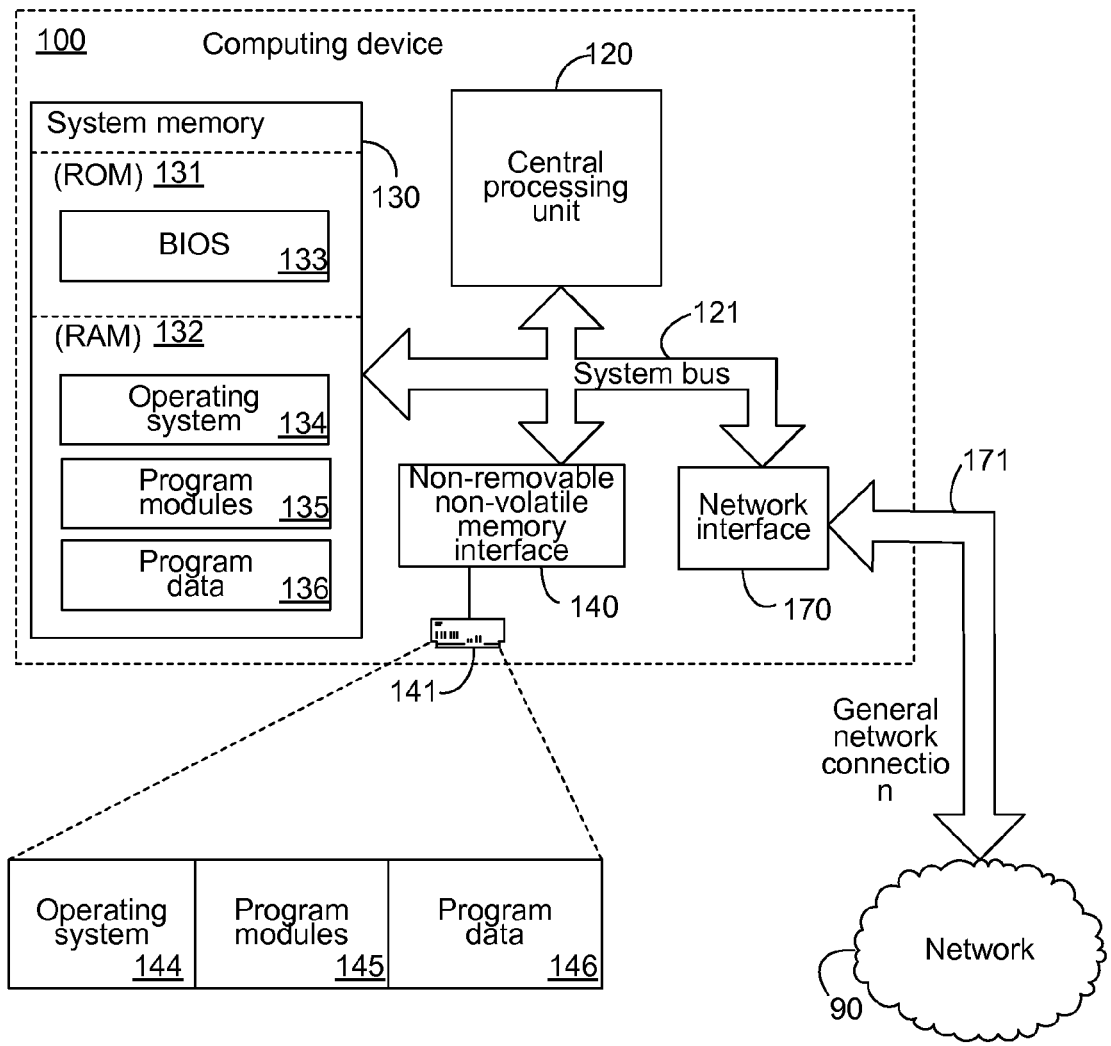
FIG. 1 is a block diagram of an exemplary computing device.

The following description relates to the extension of a process to multiple execution environments such that the process can still access the features of a host operating system, or other core software, in one execution environment even if the process is executing in another, different, execution environment, including different virtual or physical execution environments. Indeed, as used herein, the term "execution environment" is intended to refer to any type of environment that can provide for the execution of computer-readable instructions, including hardware environments of varying complexity and architecture and implementing either standard or custom instruction sets, and software environments, such as virtual computing or virtual machine environments. Furthermore, references to multiple execution environments are not meant to require similarity or parity between the referenced execution environments. A memory invariance can be maintained between two or more execution environments such that references to particular locations in memory in one execution environment identify the same bits as those same references in the other execution environments. Likewise, a thread invariance can also be maintained between a process executing in one execution environment and shadow processes executing in the other execution environments. The maintenance of such invariances can enable an application's request to be made in another execution environment by simply re-making the request in an identical manner from a shadow process.

The techniques described herein focus on, but are not limited to, the communication of an application's request to an operating system in another execution environment when the request was originally directed to the operating system within the same execution environment as the application. Thus, while the descriptions focus on requests to operating systems, any intra-application communication can be equally supported by the mechanisms described below. For example, the techniques described are equally applicable to application requests, or other types of communications, that can be directed to device drivers, widgets, plug-ins, other applications, or other core software. Therefore, reference to operating system requests in the descriptions below are meant to be illustrative only, and are not meant to limit the descriptions to operating-system-only implementations.

Although not required, the descriptions below will be in the general context of computer-executable instructions, such as program modules, being executed within one or more execution environments supported by one or more computing devices. More specifically, the descriptions will reference acts and symbolic representations of operations that are, ultimately, performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 2:
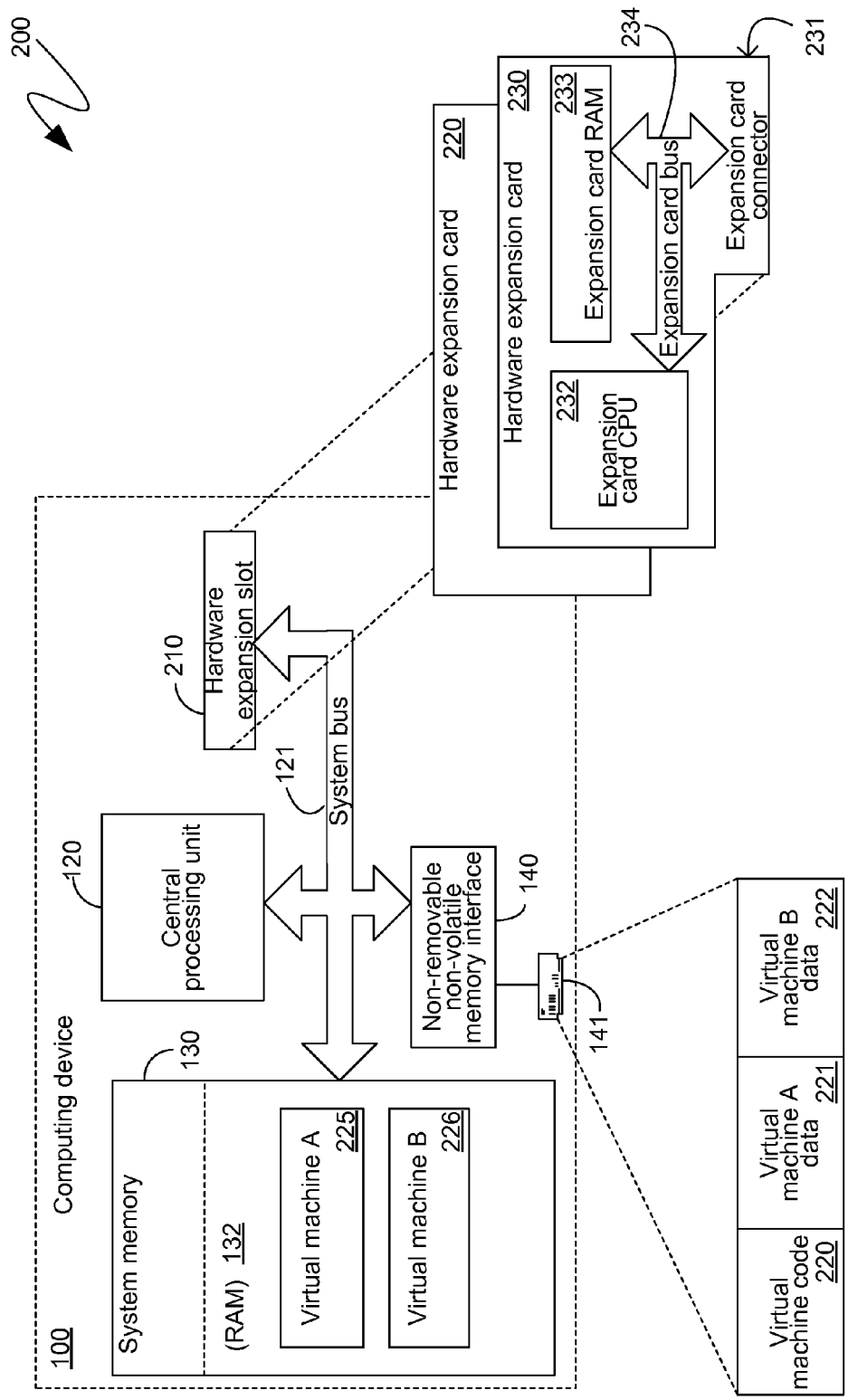
FIG. 2 is a block diagram of an exemplary computing device extended to comprise multiple execution environments.

With reference to FIG. 1, an exemplary computing device 100 is illustrated, which can support one or more execution environments in the manner illustrated in FIG. 2. Within the context of FIG. 1, the exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

The computing device 100 may operate in a networked environment using logical connections to one or more remote computers. For simplicity of illustration, the computing device 100 is shown in FIG. 1 to be connected to a network 90 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

The computing device 100 can, itself, comprise one or more execution environments, such as in the manner illustrated in FIG. 2 and described in detail below. In addition, the network interface 170 and general network connection 171 enable a computing device 100 to communicate with one or more execution environments hosted by other computing devices connected to the network 90. For purposes of the descriptions below, the physical location of the hardware supporting an execution environment is irrelevant, except for efficiency concerns since, as is well known by those skilled in the art, communications over the general network connection 171 can be significantly slower than communications over the system bus 121.

Turning to FIG. 2, the computing device 100 of FIG. 1 is illustrated within the context of a computing system 200 comprising the computing device 100 and additional hardware expansion cards 220 and 230. The hardware expansion cards 220 and 230 can be communicationally connected to the computing device 100 via the hardware expansion slot 210 connected to the system bus 121 of the computing device. Traditionally, each of the hardware expansion cards, such as hardware expansion card 230, can comprise an expansion card connector 231 that can physically interface with the hardware expansion slot 210, thereby enabling high bandwidth and low latency communication between the computing device 100 and the hardware expansion card 230. However, the mechanisms described below are not limited by the communicational mechanisms, and physical connections, between the computing device 100 and hardware expansion cards.

The computing system 200 can comprise multiple execution environments including execution environments supported by hardware expansion cards, such as hardware expansion cards 220 and 230, and execution environments supported by virtual machines, such as virtual machines 225 and 226, which can be executed by the computing device 100 with, or without, hardware expansion cards. Hardware expansion cards, such as hardware expansion cards 220 and 230, can each comprise sufficient components to support one or more execution environments. For example, hardware expansion card 230, as shown in FIG. 2, can comprise many of the same hardware components as the computing device 100, described above with reference to FIG. 1, including, for example, one or more expansion card CPUs 232, an expansion card RAM 233 and an expansion card bus 234 that can enable communication between the CPU 232, the RAM 233 and the expansion card connector 231. Similarly, a virtual machine, such as virtual machines 225 and 226, can support one or more execution environments by emulating relevant aspects of the computing device 100. Virtual machine computer-readable instructions 220 can, when executed by the computing device 100, and in conjunction with the virtual machine data 221 and 222, enable the creation of virtual machines 225 and 226 within the RAM 132 of the computing device.

The mechanisms described below, however, are not dependent upon a particular type of execution environment. Thus, while FIG. 2 illustrates some forms of execution environments that can be utilized by the mechanisms described below, other execution environments are equally compatible with the mechanisms described. Reference to execution environments in the descriptions below, and in particular, reference to execution environments 310 and 350, are, therefore, not meant to be limited to a particular type of execution environment, nor are they meant to be limited to the execution environments shown in FIG. 2.

Figure 3:
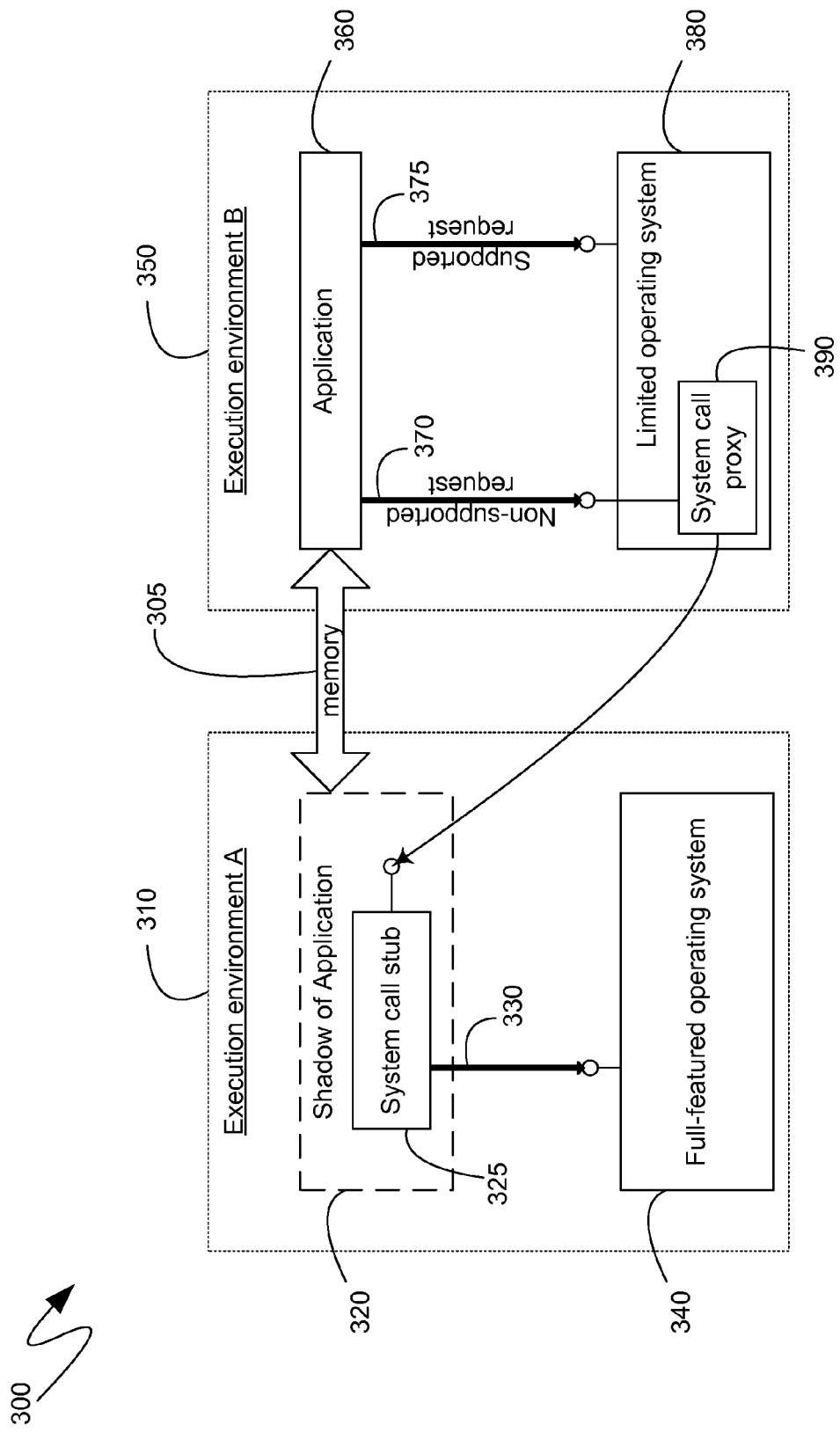
FIG. 3 is a block diagram of an exemplary communication of requests between execution environments.

Turning to FIG. 3, two execution environments, in the form of execution environments 310 and 350, are illustrated. In the illustrated embodiment, execution environment 310 can comprise a full-featured operating system 340, while the execution environment 350 can comprise a limited operating system 380. In an alternative embodiment, not illustrated in FIG. 3, the execution environment 350 can likewise comprise a full-featured operating system, including the same full-featured operating system 340 of execution environment 310, or another, different, full-featured operating system. Indeed, the terms "full-featured operating system" and "limited operating system" are used herein to for ease of illustration and reference and are not meant to refer to the relative complexity or capability of either operating system. Rather, as used below, the term "limited operating system" is meant only to indicate that the referenced operating system does not, or selects not to, support the non-supported request 370, while the term "full-featured operating system" is meant only to indicate that the referenced operating system does, indeed, support such a request, illustrated in FIG. 3 as request 330. However, as will be recognized by those skilled in the art, the ability of the mechanisms described below to support the execution of an application 360 with a limited operating system 380 within execution environment 350 can provide efficiency benefits within the context of the execution environment 350. In particular, the limited operating system 380 can be limited, not only with respect to the non-supported request 370, but can further comprise only a minimum of functionality, thereby consuming a minimum amount of computing resources from the execution environment 350 while simultaneously enabling some applications, such as those exclusively utilizing supported requests 375, to execute wholly within the execution environment 350.

Other applications, however, such as application 360, may make both supported requests 375, to which the limited operating system 380 can itself respond, and non-supported requests 370, to which the limited operating system either cannot respond, or may choose not to respond. A non-supported request 370 from the application 360 can, in one embodiment, be directed to a system call proxy 390 that can be a component of the limited operating system 380. In an alternative embodiment, the system call proxy 390 can be a component separate from the limited operating system 380, in which case the non-supported request 370 can be intercepted by the system call proxy.

Once the non-supported request 370 has been received by the system call proxy 390, the system call proxy can forward the request to a system call stub 325 executing within another execution environment 310, which can further comprise a full-featured operating system 340 that can properly respond to the non-supported request 370. The system call stub 325 can, upon receiving the non-supported request 370, make an identical request 330 to the full-featured operating system 340. In making such an identical request 330, the system call stub 325 can reference the same memory addresses as may have been referenced by the non-supported request 370 and otherwise use the same parameters as would have been provided with the non-supported request 370. Such memory addresses and other parameters can be provided by the system call proxy 390. Typically, parameters associated with the non-supported request 370 can be provided, by the application 360, in registers which can be accessed by the system call proxy 390 when it either has the non-supported request 370 directed to it, or when it intercepts the request.

The parameters, such as memory addresses, passed by the application 360 are based on the virtual memory assigned to the application 360 within the execution environment 350 and the memory mapping between that virtual memory and the underlying physical memory supporting it. Consequently, to avoid the translation of memory addresses across execution environments, in one embodiment, a memory invariance 305 can be maintained between the application 360 executing within the execution environment 350 and a shadow application 320 in the execution environment 310 such that, within the each of the execution environments 310 and 350, the same range of virtual memory is assigned, respectively, to the shadow application 320 and the application 360. In addition, the mapping of the virtual memory assigned, within each of the execution environments 310 and 350 can be mapped to the same physical memory, or other supporting storage medium, such that, if the values of the underlying physical memory changed, those changes would have an equivalent effect within both of the execution environments 310 and 350.

Given the above described memory invariance 305, a request 330 from the shadow application 320 can cause the same changes in the underlying memory as the non-supported request 370 from the application 360. For example, if the non-supported request 370 requested that a function be performed on data in a specified memory range, and the resulting values be stored in another specified memory range, then the memory invariance 305 can enable the same request, specifying the same memory ranges, to be made, in the form of request 330, from the shadow application 320. The request 330 could cause the full-featured operating system 340 to access data in the specified memory range, or it could be a Direct Memory Access (DMA) request, wherein the shadow application 320 directly access a specified memory range. In either case, due to the memory invariance 305, the same underlying data as was specified by the application 360 via the non-supported request 370 can be accessed by the shadow application 320 via request 330. Similarly, after the performance of the requested function by the full-featured operating system 340, the resulting values can be stored in the memory range specified by the request 330 from the shadow application 320 which, again due to the memory invariance 305, can be the same underlying physical memory into which the resulting values would have been stored by the limited operating system 380 if it had responded to the non-supported request 370. Thus, from the perspective of the application 360, when it subsequently requests the values from the memory range into which it had requested the results to be placed, the application 360 can be provided with the resulting values in the same manner as if the limited operating system 380 itself had performed the response to the non-supported request 370.

The application 360, therefore, can utilize, and execute on top of, the limited operating system 380 in the same manner as it would utilize, and execute on top of, the full-featured operating system 340. Those requests from the application 360, such as request 375, that the limited operating system 380 could support itself would be handled within the execution environment 350, while those requests from the application 360, such as request 370, that the limited operating system 380 could not, or would not, perform, could be preformed within the execution environment 310 with reference to shared memory 443. Should it be desirable to do so, an application could be created that utilized only mechanisms, such as request 375, that were supported by the limited operating system 380, enabling such an application to execute wholly within the execution environment 350 and not require any effort on the part of the full-featured operating system 340. However, such a "special" application need not be required, as any application that can execute within the execution environment 310, comprising the full-featured operating system 340, can similarly execute within the execution environment 350, comprising the limited operating system 380, on account of the memory invariance 305.

To maintain the memory invariance 305 one execution environment can be provided with access to the physical memory of another execution environment. Thus, for example, with reference to both FIGS. 2 and 3, if the execution environment 310 is supported by the hardware of the computing device 100, and the execution environment 350 is supported by the hardware of the hardware expansion card 230, then the CPU 120 of the computing device 100 can be provided with access to the expansion card RAM 233 via the expansion card bus 234, the expansion card connector 231, the hardware expansion slot 210 and the system bus 121. Likewise, the expansion card CPU 232 can similarly be provided with access to the RAM 132 via the same collection of hardware elements. Alternatively, if, for example, the execution environment 310 is supported by the virtual machine 225 and the execution environment 350 is supported by the virtual machine 226, then the emulated CPU of the virtual machine 225 can be provided with access to the emulated memory of the virtual machine 226 and, likewise, the emulated CPU of the virtual machine 226 can be provided with access to the emulated memory of the virtual machine 225, via inter-process communication.

In the descriptions below, the referenced embodiments are described in the context of the maintenance of the memory invariance 305 from the execution environment 350 to the execution environment 310. However, as illustrated in FIG. 3, the memory invariance 305 can be a bi-directional invariant such that, for example, changes occurring within execution environment 310 can likewise be mirrored within execution environment 350. Thus, while the descriptions below detail the maintenance of the memory invariance 305 when the application 360 issues a memory request 457 within the execution environment 350, the descriptions below are also translatable, in a straightforward manner, to the issuance of a memory request from the shadow 320 within the execution environment 310. As those of skill in the art would understand how to translate the below descriptions in an appropriate manner, for the sake of brevity, the below descriptions are not repeated as they would apply to the issuance of a memory request from the shadow 320 within the execution environment 310. Nevertheless, the embodiments described do contemplate bi-directional maintenance of the memory invariance 305.

Figure 4A:
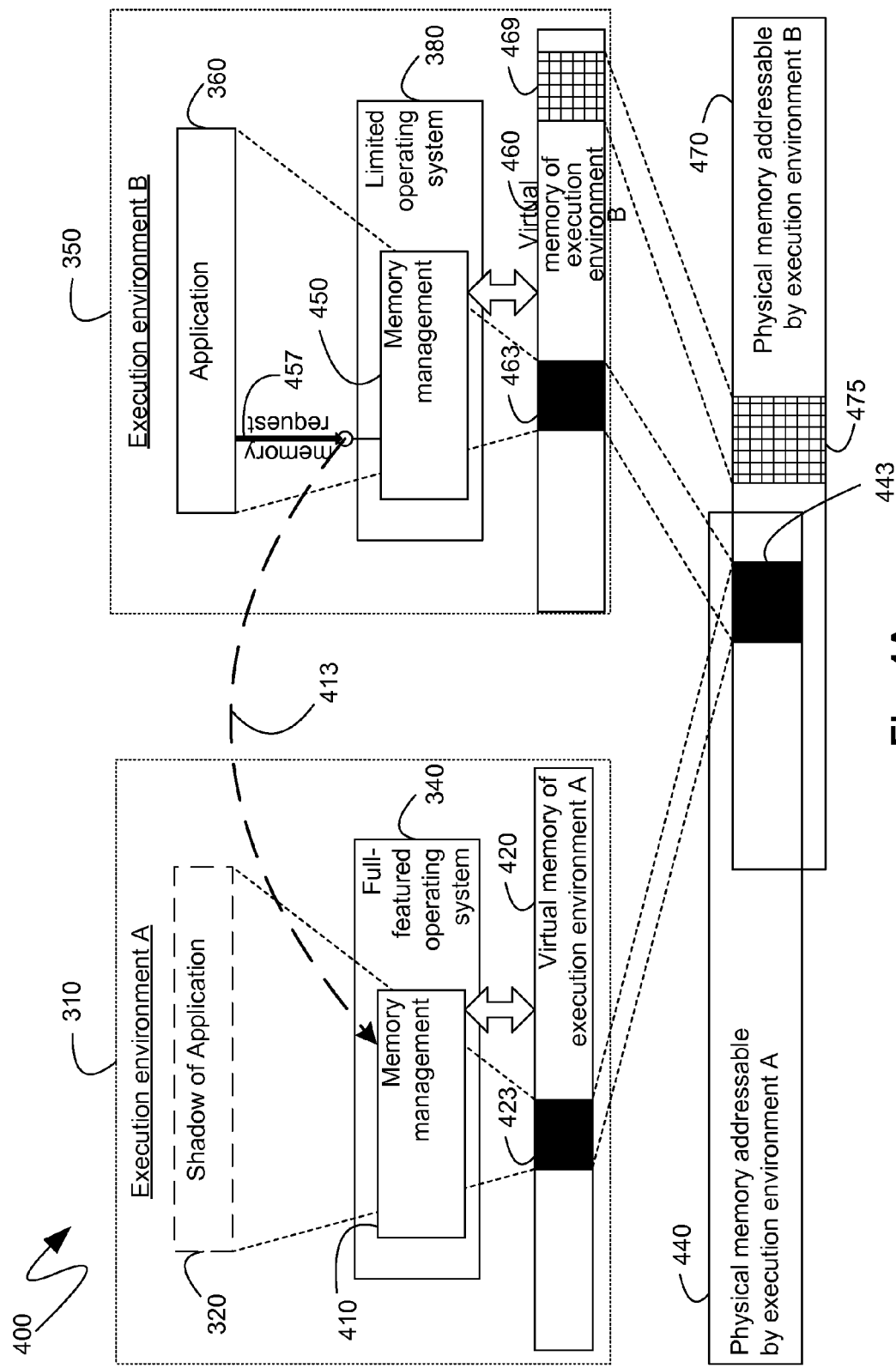
FIGS. 4 *a-c* are block diagrams of an exemplary maintenance of a memory invariance between execution environments.

In one embodiment, illustrated by the system 400 of FIG. 4a, the memory invariance 305 can be maintained by intercepting requests, such as memory request 357, from the application 360 that are intended to modify some aspect of the memory assigned to the application 360. As shown in FIG. 4a, the application 360 of FIG. 3 can be provided with a range of virtual memory, which can include virtual memory segment 463, within the execution environment 350 by the limited operating system 380 and, more specifically, by a memory management component 450 of the limited operating system. The memory management component 450 can also associate the virtual memory 463 assigned to the application 360 with a range of physical memory 443 that can be part of the physical memory 470 addressable from the execution environment 350. As will be known by those skilled in the art, other applications executing within the execution environment 350 can likewise be provided with a portion of the virtual memory 460 of the execution environment 350. Thus, as shown in FIG. 4a, another application can be assigned a range of virtual memory, including virtual memory segment 469, some or all of which can be mapped to physical memory 475, which can be part of the physical memory 470 that is accessible by the execution environment 350.

The shadow application 320 in the execution environment 310 can likewise be assigned a range of virtual memory, which can include virtual memory segment 423, from the virtual memory 420 of the execution environment 310. As with the limited operating system 380, the full-featured operating system 340 of the execution environment 310 can also comprise a memory management component 410 that can assign the virtual memory 423 to the shadow application 320 and can further coordinate the association between the virtual memory 423 and an underlying segment of physical memory 443 which can be within the physical memory 440 addressable by the execution environment 310. As indicated above, the region of physical memory 443 to which both the virtual memory 463 and the virtual memory 423 are mapped can be accessible by both the execution environment 310 and the execution environment 350.

To maintain the memory invariance 305, the range of virtual memory 423 assigned to the shadow application 320 in the execution environment 310 can be the same range of virtual memory 463 assigned to the application 360 in the execution environment 350. Thus, if, for example, the range of virtual memory 463 was defied by addresses 1024 through 8096 in the execution environment 350, with the address 0 representing the beginning of the virtual memory 460 of that execution environment, then, likewise, the range of virtual memory 423 can be defined by the same addresses 1024 through 8096 in the execution environment 310, with the address 0 in that environment representing the beginning of the virtual memory 420 of the execution environment 310. Similarly, again to maintain the memory invariance 305, the physical memory 443 to which the virtual memory 463 is mapped can be the same as the physical memory 443 to which the virtual memory 423 is mapped. Consequently, if the shadow application 320 were to issue a request to the full-featured operating system 340 that entailed the changing of the values of some of the virtual memory 423, such changes would be reflected in the physical addresses 443 and, consequently within equivalent portions of the virtual memory 463 assigned to the application 360. Thus, functions requested of the full-featured operating system 340 by the shadow application 320 can be utilized by the application 360 as if it were executing within the same execution environment as the full-featured operating system.

To maintain the memory invariance 305, changes to the virtual memory 463, or the memory mapping between the virtual memory 463 and the physical memory 443 can be propagated from the execution environment 350 to the execution environment 310 to enable equivalent changes to be made to the virtual memory 423 and the mapping between the virtual memory 423 and the physical memory 443. In one embodiment, such memory-related changes within the execution environment 350 can be detected by intercepting memory-related requests, such as memory request 457, from the application 360 to the limited operating system 380 and, more specifically, to the memory management component 450. Thus, if the application 360 were to, for example, request additional memory from the limited operating system 380, such a request could be intercepted and provided, such as via communications 413, to the memory management component 410 of the execution environment 310. In one embodiment, a system call proxy, such as system call proxy 390, described in detail above, could intercept such a memory request 457 and communicate it to a system call stub, such as system call stub 325, also described in detail above. The expansion of virtual memory 463 performed by the memory management component 450 in the execution environment 350 in response to, for example, a request 457 for additional memory from the application 360 could be mimicked by the memory management component 410 in the execution environment 310, thereby maintaining parity between the virtual memory 463 and the virtual memory 423.

Figure 4B:
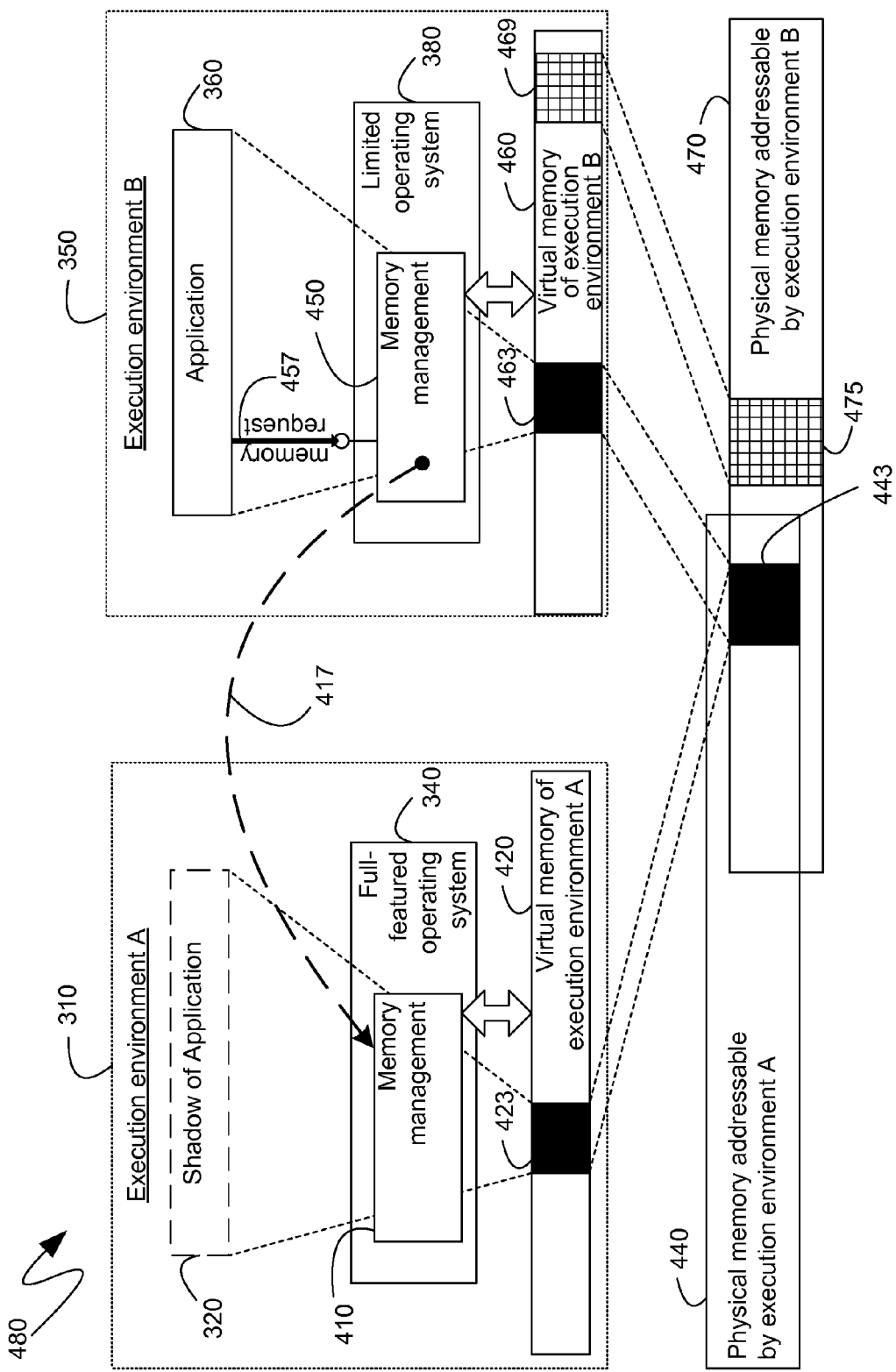

In another embodiment, rather than intercepting system calls, and other requests 457, from the application 360 that could impact the virtual memory segment 463 of the mapping to physical memory 443, the memory management component 450 could be modified or extended to itself directly communicate changes it either will, or already has, made to either the virtual memory segment 463 or the mapping to physical memory 443 to the memory management component 410, thereby enabling the memory management component 410 to make an equivalent change and maintain the memory invariance 305. Turning to FIG. 4b, the system 480 illustrates such an embodiment, where the memory-related request 457 from the application 360 is communicated to the execution environment 310 directly by the memory management component 450. Again returning to the example where the memory-related request 457 from the application 360 is a request for additional memory, the memory management component 450 can notify, such as via communications 417, the memory management component 410 in the execution environment 310 that it is going to allocate additional virtual memory to the virtual memory block 463. The memory management component 410 can then likewise increase the virtual memory block 423 to mirror the changes to the virtual memory block 463. Alternatively, the memory management component 450 can notify the memory management component 410 of changes that have already been performed, again enabling the memory management component 410 to mirror those changes within the execution environment 310.

Figure 4C:
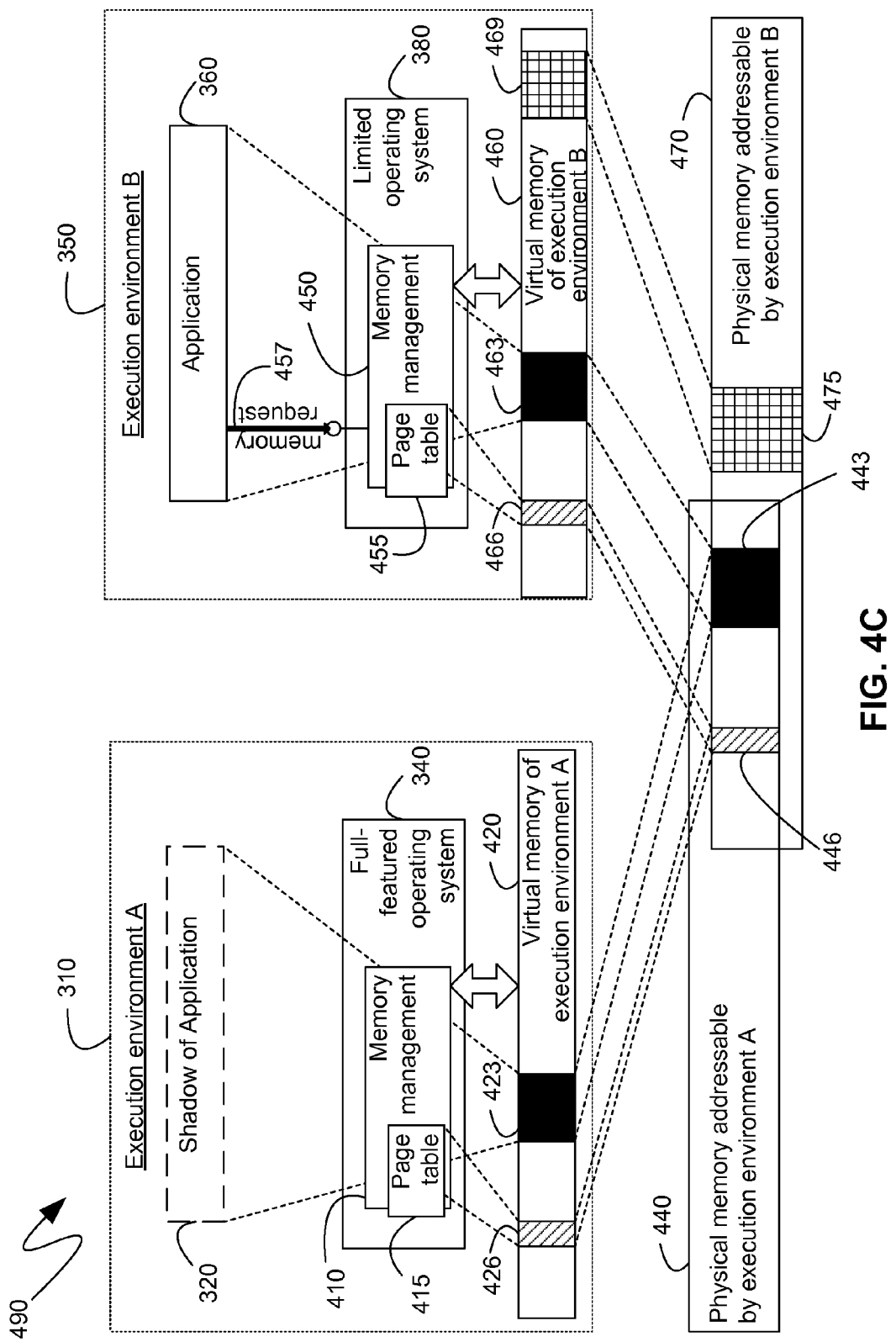

In a further embodiment, much like the physical memory 443 is commonly accessible by both the application 360 executing in the execution environment 350 and the shadow application 320 in the execution environment 320, the physical memory which stores some or all of the page table of the execution environment 350 can also be accessed by the execution environment 310 for storing some or all of its page table. In such a manner, any change to the page table, or, at least, the shared portion of the page table, such as a change in the mapping between the physical memory 443 and the virtual memory 463, will likewise become a change in the mapping between the physical memory 443 and the virtual memory 423. Turning to FIG. 4c, the system 490 illustrates a page table 455 associated with the memory management component 450 and a page table 415 associated with the memory management component 410. While the page tables 415 and 455 are the only page tables shown in FIG. 4c associated with memory management components 410 and 450, respectively, they are not meant to only represent the entire page table used by those components and can, instead, represent only a portion of the entire page table. As will be known by those skilled in the art, a page table, such as the page tables 466 and 426, comprise mappings between virtual memory, such as virtual memory segments 423 and 463, and physical memory, such as physical memory segment 443. Thus, if the memory management component 450 were to make a change to the mapping between the virtual memory 463 assigned to the application 360 and the underlying physical memory 443, such a change would be made in the page table 455. A modification to the page table 455 is, in essence, a modification to the data of the page table as it is stored in the virtual memory segment 466, which is further supported by the physical memory segment 446. Thus, a change to the page table 455 can be reflected in the physical memory segment 446 and, consequently, within the virtual memory segment 426 representing the page table 415 in the execution environment 310. As a result, the page table 415 can be updated to conform to the page table 455, and thereby maintain at least a portion of the memory invariance 305, without explicit communication between the execution environment 310 and the execution environment 350.

In one embodiment, to ensure that the updated page table 415 is used, the Translation Lookaside Buffers (TLBs) of the CPU supporting the execution environment 310 can be flushed. As will be known by those skilled in the art, the TLBs can be used to accelerate virtual memory look ups by storing a portion of a page table in the cache memory of a CPU. Since such cache memory may not be updated in the same manner as the page table 415, the TLBs can be flushed, thereby causing the CPU to reference the updated page table 415.

In a further embodiment, which can similarly utilize the flushing of TLBs, the memory invariance 305 can be maintained by enabling the limited operating system 380 access to the virtual memory 420 such that, when a request is made of the full-featured operating system 340, a determination can be made if the virtual address referenced by the request should be populated with data from the physical memory 443. A pagefault, indicating that the referenced virtual addresses should obtain data from physical memory, can cause the limited operating system 380 to populate the virtual memory 423 by referencing the correct physical addresses 443. To provide greater efficiency, the limited operating system 380 can populate the virtual memory 423 with data, not merely from the specific page that caused the pagefault, but from additional pages as well, such as associated pages, proximate pages, or the like.

Figure 5:
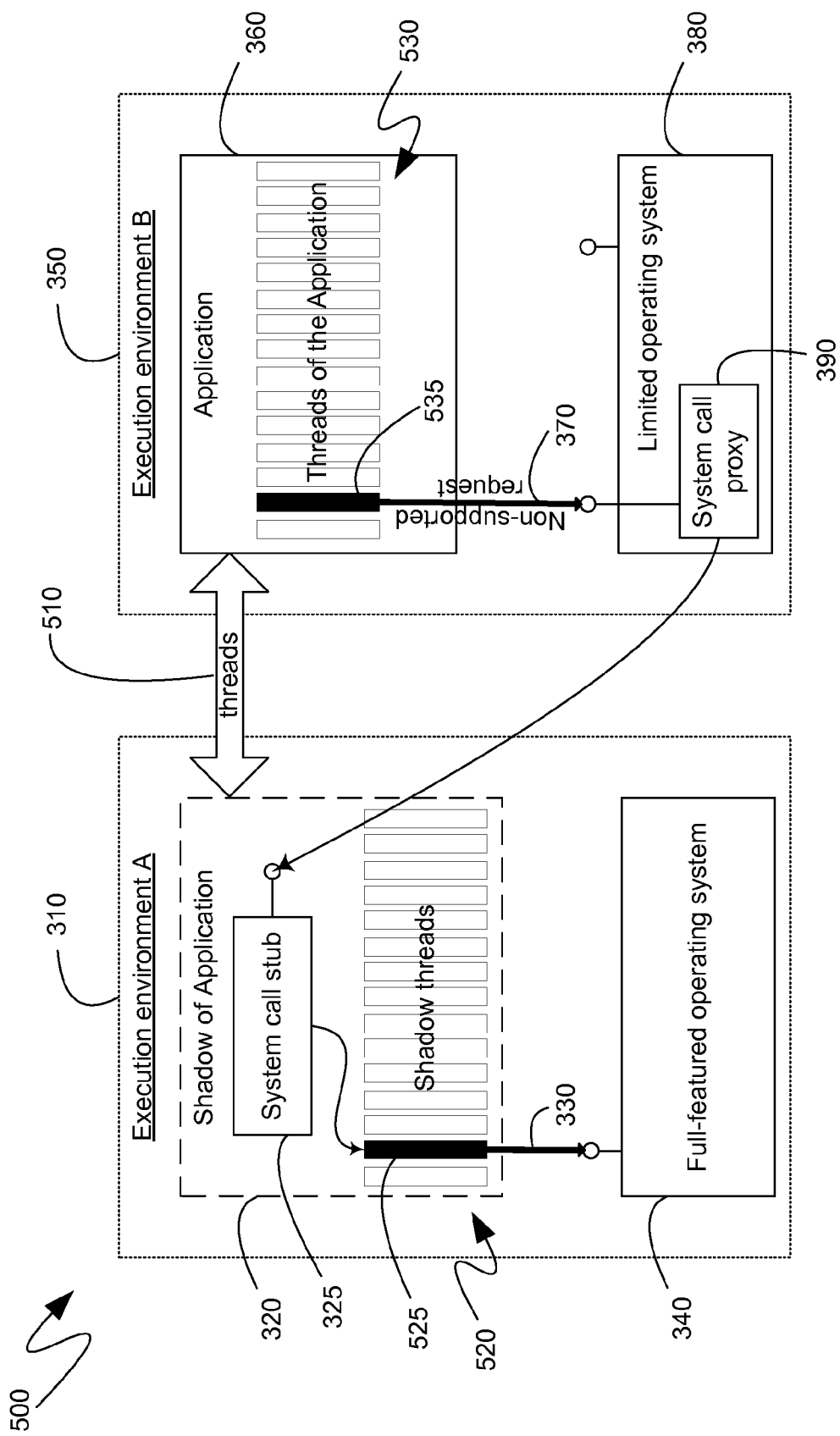
FIG. 5 is a block diagram of another exemplary communication of requests between execution environments.

Maintaining a memory invariance 305 between the execution environment 310 and the execution environment 350 can enable the shadow application 320 to make a request of the full-featured operating system 340 on behalf of the application 360 without necessarily requiring the translation of memory addresses or similar parameters. In another embodiment, a thread invariance can be maintained between the application 360 and the shadow application 320 to enable the request 330 to come from the same thread as the non-supported request 370. Turning to FIG. 5, a system 500 illustrates one such thread invariance 510. In particular, the application 360 can comprise a collection of execution threads 530, including a calling thread 535 that can make the non-supported request 370. The shadow application 320 can likewise comprise a collection of execution threads 520 that can be maintained to mirror the execution threads 530. For example, a system call proxy, such as system call proxy 390, can detect the creation, destruction, or ending of a thread within the collection of threads 530 and can communicate an indication of such a creation, destruction, or ending of a thread to a system call stub, such as system call stub 325, within the execution environment 310. Subsequently, the shadow application 320 can be modified to create, destroy, or end a thread such that the collection of threads 520 continues to mirror the collection of threads 530. As with the memory invariance 305, the thread invariance 510 can be bidirectional. Consequently, if the shadow application 320 were to create, destroy or end a thread, communication back to the execution environment 350 can enable the application 360 to mimic that creation, destruction or ending of a thread such that the collection of threads 530 remains equivalent to the collection of threads 520.

When a thread invariance 510 is maintained, the system call proxy 390 can forward to the system call stub 325 information, not only about the parameters of the non-supported request 370, but also about the thread 535 from which the request originated. When the system call stub 325 receives such information, it can cause the shadow application 320 to initiate an equivalent request 330 to the non-supported request 370. In particular, with the information regarding the calling thread 535, the system call stub 325 can inform the shadow application 320 to initiate the request 330 from an equivalent thread 525 to the calling thread 535, thereby further providing an equality between the non-supported request 370 and the request 330.

Figure 6:
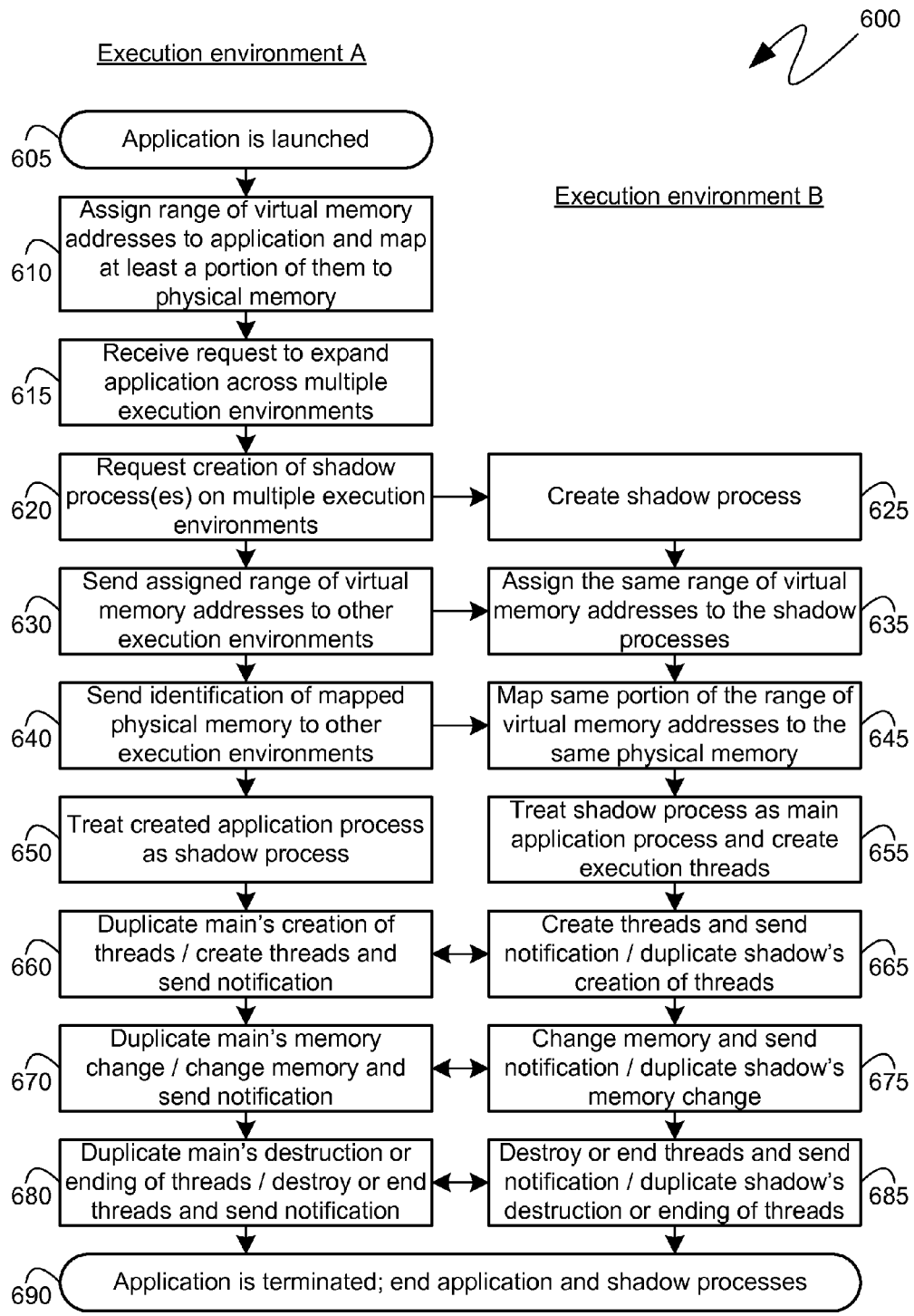
FIG. 6 is an exemplary flow diagram for establishing and maintaining a memory invariance between execution environments.

Turning to FIG. 6, a flow diagram 600 illustrates an exemplary series of steps which, according to one embodiment, can set up and maintain either the memory invariance 305, the thread invariance 510, or a combination thereof. The steps of the flow diagram 600 are visually divided into steps that can be performed by one execution environment and the steps that can be performed by another execution environment. For purposes of illustration and description, the steps of FIG. 6 are aligned with the execution environments 310 and 350, comprising the shadow application 320, and the application 360, respectively, in the manner described in detail above.

As shown, at an initial step 605 an application can be launched within the execution environment 310. Because the execution environment 310 comprises a full-featured operating system 340, it can be desirable to initially launch applications within such an execution environment. For example, applications may require, during startup, features or abilities of the full-featured operating system 340 that may not be available from the limited operating system 380. Subsequently, after the application has been launched, primary execution of the application can be transferred to the execution environment 350, resulting in the nomenclature used above with respect to the application 360 and the shadow 320. Such a transfer will be described with reference to steps 650 and 655, below.

Once the application is launched at step 605 within the execution environment 310, the full-featured operating system 340 can assign a range of virtual memory addresses, such as virtual memory 423, to the application at step 610. The full-featured operating system 340 can also map the assigned range of virtual memory addresses to physical memory, such as physical memory 443, at step 610. Subsequently, at step 615, or at another time during the application's execution, a request to expand the application can be received at step 615. In one embodiment, the request to expand the application can be made by the application itself, such as when it is instructed to perform a task that could benefit from parallel processing, or when it becomes aware of another execution environment. In an alternative embodiment, the application could set a flag, or provide another indicator, when it is launched at step 605, indicating that it should be expanded across multiple execution environments. In a still further alternative embodiment, an external tool or other collection of computer-executable instructions can request the expansion of the application across multiple execution environments.

Upon receiving such a request at step 615, components executing within the execution environment 310, such as the full-featured operating system 340, or other elements, can send a request, at step 620, to one or more other execution environments, such as execution environment 350, requesting the creation of a shadow process mirroring the application that can be already executing within the execution environment 310. Upon receiving the request to create a shadow process, the execution environment 350 can create such a shadow process at step 625.

To initiate the memory invariance 305, or the thread invariance 510, elements within the execution environment 310 can communicate with elements within the execution environment 350 to exchange relevant thread or memory information. Thus, at step 630 information regarding the assigned range of virtual memory 423 can be communicated to the execution environment 350. At step 635, upon receiving the virtual memory information, elements within the execution environment 350 can assign an equivalent range of virtual memory 463 to the shadow application created at step 625. Similarly, at step 640, information regarding the mapping of the assigned virtual memory 423 to physical memory 443 can be communicated to the execution environment 350, where, at step 645, the same mapping can be applied to the virtual memory 463.

Having set up a memory invariance, the execution of some or all of the application launched at step 605 can be transferred to the execution environment 350. Thus, at step 655, the shadow process can be treated as the "main" application referenced previously as application 360, and the application launched at step 605 can be treated, at step 650, as the previously referenced shadow application 320. At step 655, execution threads, such as execution threads 530, can be created within the application 360 to enable the application to perform useful work within the execution environment 350. At step 665, notification of the creation of such threads can be communicated back to the execution environment 310. Upon receiving such a notification, elements within the execution environment 310 can, at step 660, create the same threads within the shadow process 320. To maintain the bidirectional nature of the thread invariance 510, steps 660 and 665 can similarly comprise the communication, of the creation of threads within the execution environment 310, back to the execution environment 350, whereupon such creation of threads can be duplicated.

The memory invariance 305 and the thread invariance 510 can further be maintained by steps 670, 675, 680 and 685, which can comprise communication, between the execution environments 310 and 350, of information regarding the memory consumption and thread utilization of the application 360 and the shadow application 320. In particular, at step 675, changes to the virtual memory 463, or changes to the mapping between the virtual memory 463 and the physical memory 443, can be communicated to the execution environment 310, where elements, such as the memory manager 410, can mirror those changes with the virtual memory 423 at step 670. Analogously, changes to the virtual memory 423, or changes to the mapping between the virtual memory 423 and the physical memory 443, performed within the execution environment 310 at step 670 can be communicated back to the execution environment 350, and step 675 can further comprise the duplication of those changes within the execution environment 350. At step 685, the creation, destruction, or ending of one or more of the execution threads 530 can be communicated to the execution environment 310 and, upon receiving such a communication, elements, such as a system call stub, can mirror those changes to the threads 520 at step 680. Step 680 can also comprise the creation, destruction, or ending of one or more of the execution threads 520 and the communication of the same to the execution environment 350 where step 685 can likewise further comprise the mirroring of such creation, destruction or ending of one or more execution threads within the context of the execution threads 530. Eventually, at step 690, the application can be terminated, or, at least, the need for the application to be extended across multiple execution environments can end, and at least one of the application 360 or the shadow application 320 can end, with the remaining process assuming all of the application's execution, should any remain to be performed.

Figure 7:
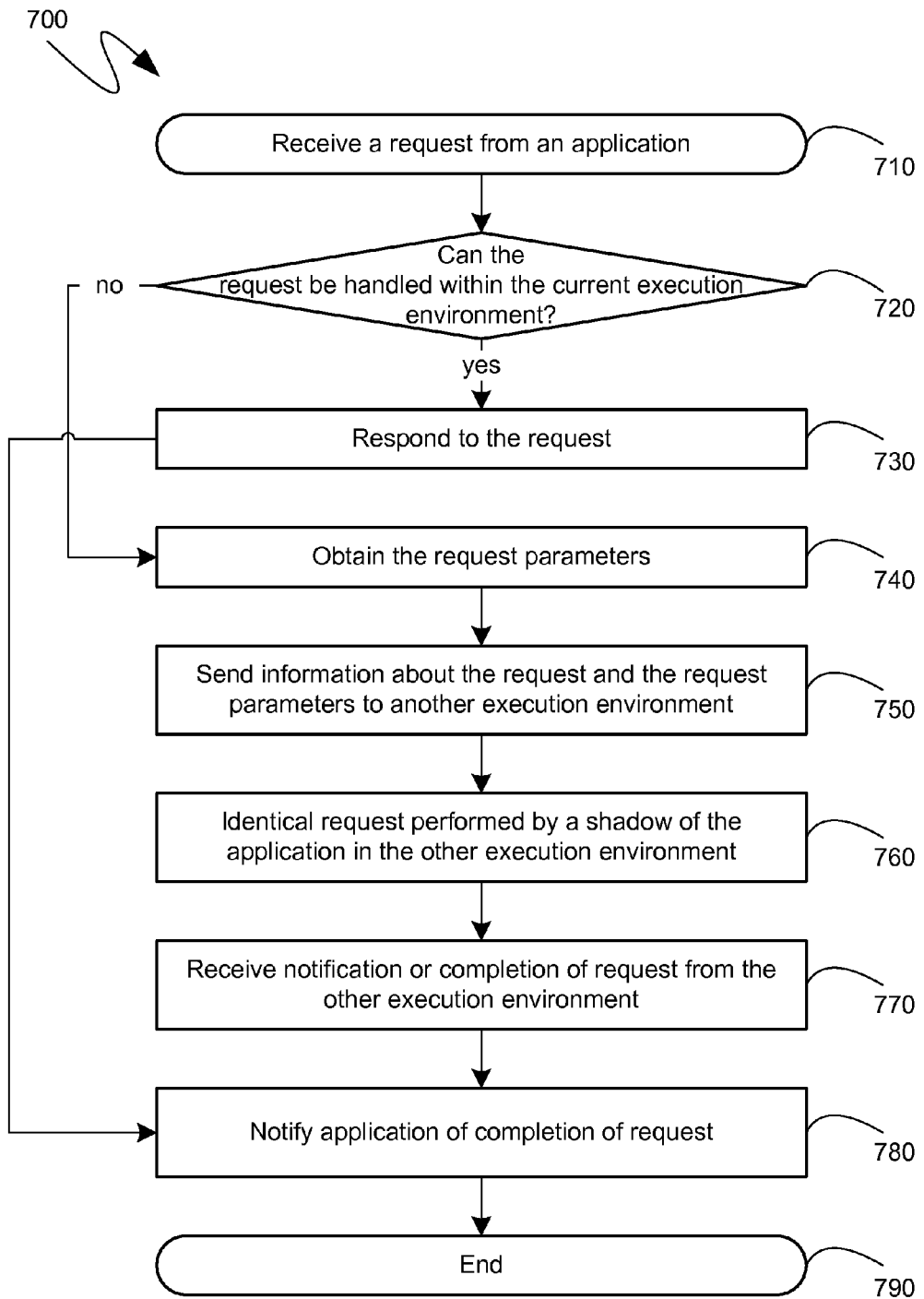
FIG. 7 is an exemplary flow diagram for communicating a request from one execution environment to another.

The flow diagram 700, shown in FIG. 7, illustrates an exemplary mechanism for utilizing the memory invariance 305 or the thread invariance 510, such as those set up by the mechanisms of flow diagram 600, described in detail above. Initially, at step 710, a request from an application, such as application 360, can be received. At step 720, a determination can be made as to whether the request can be handled within the execution environment 350 of the application 360, such as by the limited operating system 380. If the request can be handled within the execution environment 350, then the request can be responded to at step 730, and the processing associated with that request can end at step 790.

However, if the request received at step 710 cannot be handled by elements executing within the execution environment 350, a proxy, such as the system call proxy 390, can obtain the parameters of the request, and other relevant information, at step 740. Subsequently, at step 750, the proxy can send the obtained information to a stub, such as the system call stub 325 executing in another execution environment 310. The stub in the other execution environment 310 can, using the information obtained from the proxy, cause a shadow application 320 to make an identical request at step 760. Once the request is completed, the shadow application can be notified at step 770 and, also at step 770, the proxy in the original execution environment 350, can be notified. The proxy can then notify the application, at step 780, that the request was completed and, subsequently, at step 790, processing associated with that request can end. Because of the memory invariance 305 and the thread invariance 510, the performance of the request issued by the shadow application 320 at step 760 can cause an equivalent change to the underlying memory values in the same manner as if the request had been performed within the execution environment 350 at step 730.

Therefore, as can be seen from the above descriptions, mechanisms for transferring application requests across execution environments in a simple manner have been presented. In view of the many possible variations of the subject matter described herein, we claim as our invention all such embodiments as may come within the scope of the following claims and equivalents thereto.

What is claimed:

1. A computer-readable storage medium comprising computer-executable instructions for executing processes across multiple execution environments, the computer-executable instructions comprising instructions for:
    maintaining a memory invariance between a requesting process, hosted by a first hosting process and executing in a first execution environment, and a shadow process hosted by a second hosting process executing in a second execution environment, the shadow process being associated with the requesting process, the memory invariance comprising implementation of virtual memory addresses assigned to at least a portion of the requesting process and at least a portion of the shadow process, wherein the virtual memory addressing maps to a same physical memory such that both the process and its shadow utilize identical virtual memory that maps to a same region of physical memory;
    receiving, in the first execution environment, a first request from the requesting process, the first request associated with one or more functions excluded from the first hosting process but supported by the second hosting process;
    communicating the first request to the second execution environment; and
    initiating, in the second execution environment, a second request, equivalent to the first request, from the shadow process to the second hosting process, the second request generated based at least in part on translation of the first request after interception of the first request in the first execution environment.

2. The computer-readable storage medium of claim 1, wherein the computer-executable instructions directed to maintaining the memory invariance comprise computer-executable instructions for providing, to processes executing in the first execution environment and the second execution environment, access to a same physical memory storing at least a portion of a page table.

3. The computer-readable storage medium of claim 1, wherein the computer-executable instructions directed to maintaining the memory invariance comprise computer-executable instructions for receiving, in one of the first or second execution environments, an unpopulated virtual address notification indicating a failed memory access due to an unpopulated virtual address, and causing population of the unpopulated virtual address in another of the first or second execution environments.

4. The computer-readable storage medium of claim 1, wherein the computer-executable instructions directed to maintaining the memory invariance comprise computer-executable instructions for receiving a notification regarding a change in virtual memory addresses, the notification received from a process controlling memory mapping in one of the first or second execution environments, and relaying the notification of the change to another of the first or second execution environments.

5. The computer-readable storage medium of claim 1 comprising further computer-executable instructions for creating the requesting process and the shadow process so as to create the memory invariance between them.

6. The computer-readable storage medium of claim 1 comprising further computer-executable instructions for maintaining a thread invariance between the requesting process and the shadow processes, the thread invariance comprising a one-to-one correspondence between a first set of threads of the requesting process and a second set of threads of the shadow process; wherein the initiating the second request comprises initiating the second request from a thread from the second set of threads corresponding to an initiating thread from the first set of threads that initiated the first request.

7. The computer-readable storage medium of claim 6, wherein the computer-executable instructions for maintaining the thread invariance comprise computer-executable instructions for detecting a creation, termination or destruction of a first thread from the first set of threads, and notifying the second hosting process of the detected creation, termination or destruction such that the second hosting process causes an equivalent creation, termination or destruction of a second thread in the second set of threads, the second thread corresponding to the first thread.

8. A method comprising:
   maintaining a memory invariance between a requesting process, hosted by a first hosting process and executing in a first execution environment, and a shadow process executing in a second execution environment, the shadow process being associated with the requesting process and being hosted by the second hosting process, wherein the memory invariance comprises instantiation of equivalent virtual memory addresses between the requesting process and the shadow process, wherein the virtual memory addressing maps to a same physical memory such that both the process and its shadow utilize identical virtual memory that maps to the same region of physical memory;
   receiving, in the first execution environment, a first request from the requesting process, the first request associated with one or more functions excluded from the first hosting process, but supported by the second hosting process;
   communicating the first request to the second execution environment; and
   initiating, in the second execution environment, a second request, equivalent to the first request, from the shadow process to the second hosting process, the second request generated based at least in part on translation of the first request after interception of the first request in the first execution environment.

9. The method of claim 8, wherein the equivalent virtual memory addresses are assigned to at least a portion of the requesting process and at least a portion of the shadow process, the equivalent virtual memory addresses mapping to a same physical memory.

10. The method of claim 8, wherein the maintaining the memory invariance comprises providing, to processes executing in the first execution environment and the second execution environment, access to a same physical memory storing at least a portion of a page table.

11. The method of claim 8 further comprising maintaining a thread invariance between the requesting process and the shadow processes, the thread invariance comprising a one-to-one correspondence between a first set of threads of the requesting process and a second set of threads of the shadow process, wherein the initiating the second request comprises initiating the second request from a thread from the second set of threads corresponding to an initiating thread from the first set of threads that initiated the first request.

* * * * *